United States Patent
Choulos et al.

(10) Patent No.: US 11,882,235 B2
(45) Date of Patent: Jan. 23, 2024

(54) QUAD TVS PROTECTION CIRCUIT FOR AN ELECTRONIC DSL COMPONENT

(71) Applicant: ARRIS Enterprises LLC, Suwanee, GA (US)

(72) Inventors: Christopher John Choulos, Oakton, VA (US); Robert Charles Burk, Ashby, MA (US); Viswanath Bhagavatula Rao, Auburn, CA (US); Andrew Carl Brost, Cool, CA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 18/117,569

(22) Filed: Mar. 6, 2023

(65) Prior Publication Data

US 2023/0208965 A1    Jun. 29, 2023

Related U.S. Application Data

(63) Continuation of application No. 17/477,794, filed on Sep. 17, 2021, now Pat. No. 11,632,458.

(60) Provisional application No. 63/080,265, filed on Sep. 18, 2020.

(51) Int. Cl.
| | |
|---|---|
| *H04M 3/18* | (2006.01) |
| *H02H 9/04* | (2006.01) |
| *H04M 3/00* | (2006.01) |

(52) U.S. Cl.
CPC .............. *H04M 3/18* (2013.01); *H02H 9/04* (2013.01); *H04M 3/007* (2013.01)

(58) Field of Classification Search
CPC .. H04M 3/007; H04M 3/18; H02H 9/04–046; H01L 27/0255
See application file for complete search history.

(56) References Cited

U.S. PATENT DOCUMENTS

| | | |
|---|---|---|
| 2005/0199981 A1 | 9/2005 | Walters |
| 2007/0086129 A1 | 4/2007 | Vos |
| 2008/0094766 A1 | 4/2008 | Casey |

OTHER PUBLICATIONS

International Search Report and Written Opinion of the International Searching Authority dated Jan. 4, 2022 in International (PCT) Application No. PCT/US2021/050834.

(Continued)

*Primary Examiner* — Jared Fureman
*Assistant Examiner* — Christopher J Clark
(74) *Attorney, Agent, or Firm* — Wenderoth, Lind & Ponack, L.L.P.

(57) ABSTRACT

A protection circuit for use with an electronic DSL component having a tip connection and a ring connection, the protection circuit including: a first unidirectional transient-voltage-suppression (TVS) diode, having a negative TVS breakdown voltage BDV and diode forward voltage DV clamp, connected between Vcc and the tip connection of the DSL component; a second unidirectional TVS diode, having a diode forward voltage DV, connected between the tip connection of the DSL component and a negative ground clamp node; a third unidirectional TVS diode, having a negative TVS breakdown voltage BDV and diode forward voltage DV clamp, connected between Vcc and the ring connection of the DSL component; and a fourth unidirectional TVS diode, having a diode forward voltage DV, connected between the ring connection of the DSL component and the negative ground clamp node.

20 Claims, 16 Drawing Sheets

(56) References Cited

OTHER PUBLICATIONS

Semiconductor Components Industries, LLC, "AND8231/D Circuit Configuration Options for TVS Diodes Introduction", Jan. 2005, XP055874207, URL: https://www.mouser.com/pdfdocs/src-tutorials/Circuit-Configuration-Options-for-TVS-Diodes.pdf.
Datasheet for Littlefuse SP4023. Apr. 1, 2020. (Year: 2020).
Datasheet for Littlefuse SP4022. May 5, 2020. (Year: 2020).
International Preliminary Report on Patentability and Written Opinion dated Mar. 30, 2023 in International Application No. PCT/US2021/050834.

ESD Results

| Unit # | BGW210 S/N | Passes @ | Power Cycle | Result |
|---|---|---|---|---|
| 104 | R91NG8HL100TBD | 9KV | No | Sent To Santa Clara For RvR Testing |
| 107 | R91NG8HL100267 | 9KV | No | Sent To Santa Clara For RvR Testing |
| 108 | R91NG8HL100147 | 12KV | No | Took To Failure @14KV |
| 109 | R91NG8HL100073 | 12KV | Yes | Passes @12KV After 200 Power Cycles, Took To Failure @14KV |
| 110 | R91NG8HL100031 | 12KV | Yes | Passes @12KV After 200 Power Cycles, Took To Failure @14KV |
| 111 | R91NG8HL100098 | 9KV | Yes | Passes @9KV After 200 Power Cycles, Temp Rise @14KV |
| 112 | R91NG8HL100099 | 8KV | Yes | Line 2 Temp Rise @9KV, Line 2 Dead After 200 Power Cycles |
| 113 | R91NG8HL100239 | 9KV | Yes | Passes @9KV After 200 Power Cycles, Temp Rise @14KV |
| 114 | R91NG8HL100208 | 9KV | Yes | Passes @9KV After 200 Power Cycles, Temp Rise @14KV |
| 115 | R91NG8HL100219 | 9KV | Yes | Passes @9KV After 200 Power Cycles, Temp Rise @10KV |

FIG. 8

| Parameter | Symbol | Units | Protek PDT5178 | Littelfuse SP4023 | Protek GBLC15 |
|---|---|---|---|---|---|
| Peak Pulse Power (tp = 8/20μs) | Ppp | W | 500 | 450 | 350 |
| Peak Current (tp = 8/20μs) | Ipp | A | 15 | 12 | NA |
| Operating Temperature | Top | °C | -55 To 150 | -40 To 150 | -55 To 150 |
| Storage Temperature | Tstor | °C | -55 To 150 | -55 To 150 | -55 To 150 |

FIG. 9

| Parameter | Symbol | Units | Test Conditions | Protek PDT5178 | Littelfuse SP4023 | Protek GBLC15 |
|---|---|---|---|---|---|---|
| Maximum Reverse Standoff Voltage | $V_{RWM}$ | V | IR≤1μA | 24 | 15 | 15 |
| Minimum Breakdown Voltage | $V_{BD}$ | V | IT=1mA | 26 | 16 | 16.7 |
| Leakage Current | Top | °C | | -55 To 150 | -40 To 150 | -55 To 150 |
| Typical Clamp Voltage | Vctyp | V | IPP=1A, tp=8/20μs, Fwd | | 23 | |
| | | V | IPP=2A, tp=8/20μs, Fwd | | 24 | |
| | | V | IPP=10A, tp=8/20μs, Fwd | | 35 | |
| | | V | IPP=12A, tp=8/20μs, Fwd | | 37.5 | |
| | | V | IPP=15A, tp=8/20μs, Fwd | 55 | | |
| Maximum Clamping Voltage | Vcm | V | IPP=1A, tp=8/20μs, Fwd | 38 | | 24 |
| | | V | IPP=12A, tp=8/20μs, Fwd | | 40 | |
| Dynamic Resistance | $R_{DYN}$ | Ohms | TLP tp=100ns | | 0.55 | |
| ESD Withstand Voltage | $V_{ESD}$ | KV | IEC61000-4-2 (Contact Discharge) | +/-8 | +/-30 | +/-20 |
| | | KV | IEC61000-4-2 (Air Discharge) | +/-15 | +/-30 | +/-25 |
| EFT | | A | IEC61000-4-4 (5/50nS) | 40 | 40 | 40 |
| Typical Diode Capacitance | Cdtyp | pF | Reverse Bias=0V, f=1MHz | 1.4 | 1.3 | 3 |
| Maximum Diode Capacitance | Cdmax | pF | Reverse Bias=0V, f=1MHz | 5 | 2 | |

FIG. 10

QUAD TVS PROTECTION CIRCUIT FOR AN ELECTRONIC DSL COMPONENT

BACKGROUND

Digital Subscriber Line (DSL) refers to technologies for communication of data over telephone lines. DSL technology is built into various electronic devices for providing various types of data communication, such as internet connection, VOIP, and audio/video streaming services, for a premises. Fundamentally, DSL technologies can be implemented in a modem, but depending on the functionalities provided, the DSL device can be referred to as a router, gateway, or access point.

It has been found in some DSL devices, (e.g., the BGW210 gateway device including a BCM6303 line driver IC) that under certain conditions a latent DSL line driver failure may occur. For example, it has been observed that after an electrostatic discharge (ESD) contact discharge test, the DSL interface of the device no longer worked. For example, testing of devices for electrostatic discharge (ESD) contact discharge up to +/−8 kV showed device failures. Further, it has been found that ESD contact discharge greater than +/−4 kV can compromise the DSL line driver IC, which can present as electrical over-stress (EOS) damage. Such compromised devices could then prematurely fail under subsequent power reboot cycles. ESD testing followed by repetitive power cycles promoted premature DSL line driver failure. Premature failures were found to be the result of progressive ESD damage (EOS) accelerated by repetitive power cycles. Observations included: a) The line driver case temperature would rise above nominal 5 or more degrees Celsius upon ESD EOS damage; b) EOS damaged parts would typically operate yet progressively worsen until failure upon multiple power cycles; and c) Most EOS tests failed in the "negative" ESD pulse direction.

Root cause analysis identified damaged ESD transistors in the ESD rail-clamp between two internal power rails. Furthermore, the ESD ingress conduction path was identified to be the differential output pin(s) to the power and/or ground.

The present disclosure sets forth the ESD circuit failure to be addressed, compares related protection circuit elements and metrics, provides a list of key technical specifications, and provides new components that eliminate the failure. Due to the complex ESD test configuration with high voltage and fast signal switching speeds, the resulting Electro Magnetic Pulse (EMP) tends to prevent direct measurement of voltages and currents required for direct failure analysis. Therefore, a series of experiments was used to provide the parameters for the new circuits disclosed herein which represent a solution to the previous component failures.

SUMMARY

A first aspect of the disclosure is a protection circuit for use with an electronic DSL component having a tip connection and a ring connection, the protection circuit including a first unidirectional transient-voltage-suppression (TVS) diode, having a negative breakdown voltage BDV and a diode forward voltage DV connected between Vcc and the tip connection of the DSL component; a second unidirectional TVS diode, having a negative breakdown voltage BDV and a diode forward voltage DV connected between the tip connection of the DSL component and a negative ground clamp node; a third unidirectional TVS diode, having a negative breakdown voltage BDV and a diode forward voltage DV connected between Vcc and the ring connection of the DSL component; and a fourth unidirectional TVS diode, having a negative breakdown voltage BDV and a diode forward voltage DV connected between the ring connection of the DSL component and the negative ground clamp node.

A second aspect is that a TVS clamp amount for a negative common mode voltage on the tip and ring connections is substantially Vcc minus BDV and positive common mode voltage on the tip and ring connections is substantially Vcc plus DV.

A third aspect is that a diode clamp amount for a secondary negative common mode voltage clamp on the tip and ring connections is substantially negative ground clamp minus DV.

A fourth aspect is that a clamp amount of a differential mode voltage between the tip and ring connections is substantially BDV.

FIG. 1 shows the DSL line driver, BCM6303, Output Stage Block Diagram.

FIGS. 2A, 2B, and 2C show the ESD clamp schematic.

FIG. 8 shows ESD results.

FIG. 9 shows absolute maximum power ratings.

FIG. 10 shows electrical characteristics at 25 degrees Celsius.

DETAILED DESCRIPTION

Evaluation of devices that had failed testing, and which had therefore exhibited DSL interface failures, revealed ESD rail clamp transistor damage and ESD ingress through the line driver output pin of the line driver IC. Both differential (+/−) pins were found to be subject to ESD damage and failure. Disclosed herein are exemplary protection circuits included in a DSL device (e.g., modem, gateway) that achieve ESD contact protection greater than +/−4 kV on the DSL line driver IC included in the DSP device.

The ESD test configuration is complex (ESD Gun; Device Under Test (DUT); AC/DC Power Supply; Test Ground; ESD Gun Ground Return) with high voltage fast switching signals (<1 nS) resulting in large Electro Magnetic Pulse (EMP) disturbances preventing direct measurement of currents and voltages for analysis. According to an example contact discharge specification (e.g., DIRECTV's DTV CPDV-HPL-0099 ESD Contact Discharge specification), the test discharge was done individually on each DSL line driver TIP/RING pin. The discharge was made through six feet of CAT-3 telephone wire. The received ESD energy at the DSL modem RJ14 registered jack (RJ) is complex, primarily common mode yet with a small differential mode component resulting from the telephone wire twisted pair inter-twist capacitive coupling. The received ESD pulse is transferred to the DSL line driver secondary protection circuit through the DSL transformer inter-winding capacitance with similar ESD pulse polarity and voltage modes.

A series of experiments was used to identify an ESD solution that improves the DSL line driver ESD immunity. Design improvements were obtained from a series of ESD contact discharge tests. Many tests were performed to limit or reduce the ESD exposure to the line driver output pin(s), or to limit the power supply conduction current. Various current limiting devices, (e.g., TBU (Bourns Transient Blocking Unit) and TCS (Bourns Transient Current Suppressor)), were tried in the power feed and line driver output pin signal path. Various combinations of bi-directional transient-voltage suppression (TVS) clamps were tried to reduce common mode voltage at the line driver output pins, and to limit the +12V power excursions. Secondary Surge/ESD protector device parallel power/ground clamping diodes were tried to improve common mode clamping of voltages reaching the line driver. Some experiments improved ESD immunity better than others.

With the knowledge that common mode clamping was key, use of unidirectional TVS diodes, (e.g., Littelfuse SP4022), were tested in parallel with the existing Protek TVS device steering diodes. Acceptable performance was achieved on five modified units. Further design review led to the determination that the resulting circuit was redundant with the existing Protek part. The Protek part was removed just using the unidirectional TVS diodes in its place.

Figure 1:
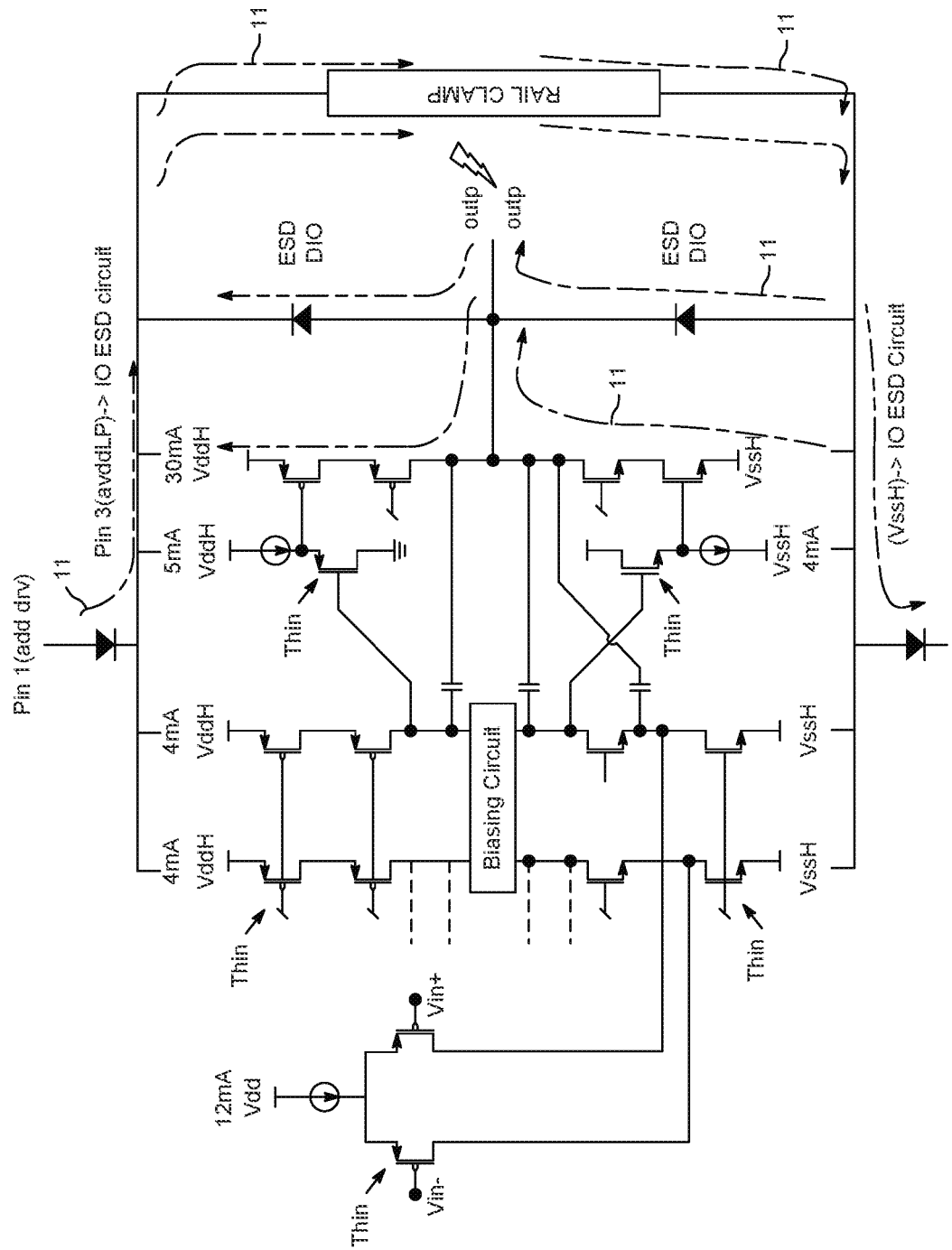

As explained above, ESD ingress was determined to be the line driver output pin(s) with egress through the power and ground pins. The ESD damaged portion of the line driver die was determined to be an ESD Rail Clamp circuit internal in the DSL line driver IC. The Rail Clamp ESD conduction path is illustrated in FIG. 1, (showing the test example DSL line driver, BCM6303, Output Stage Block Diagram). FIG. 1 also shows failure of the ESD rail clamp.

Figure 2A:
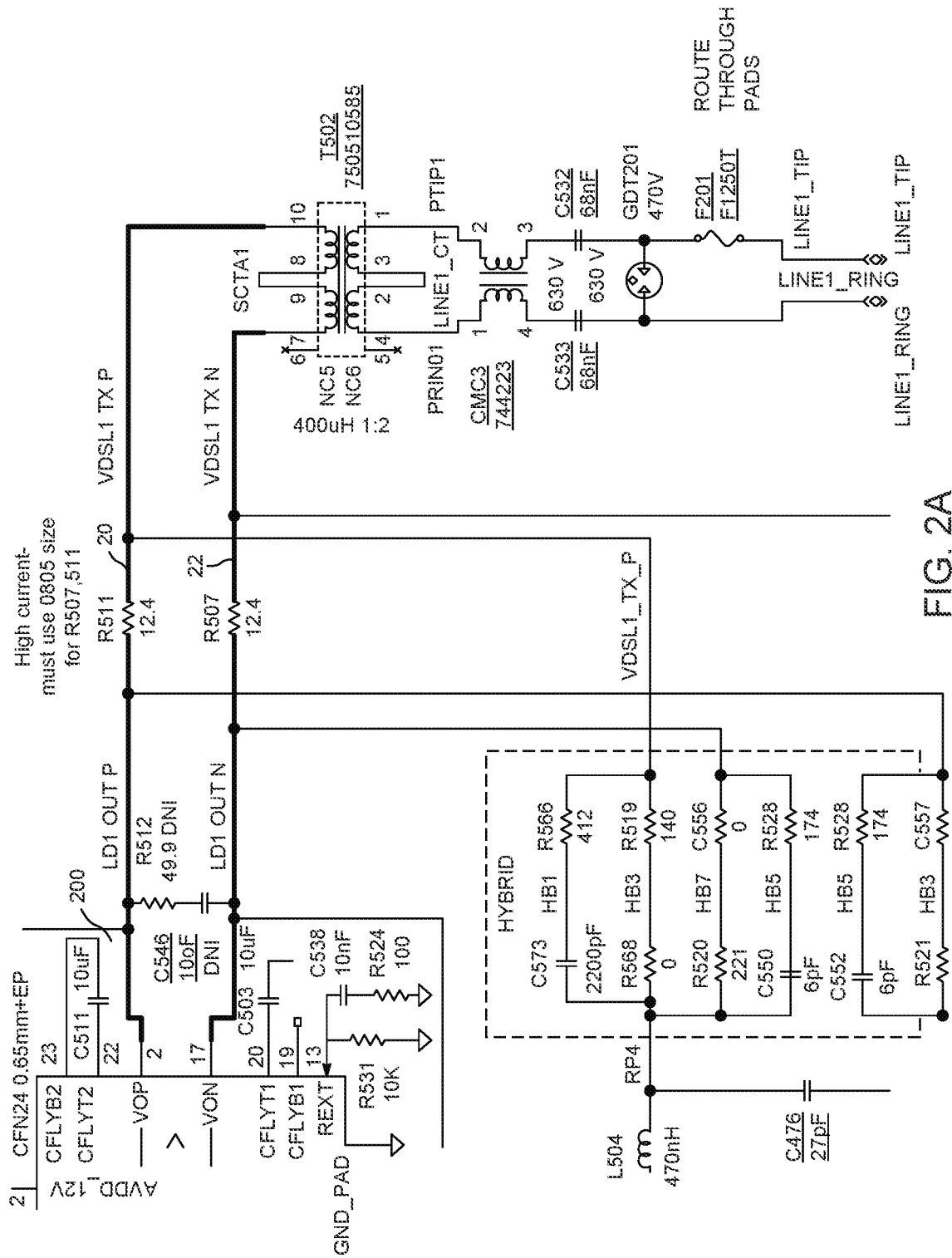
Figure 2B:
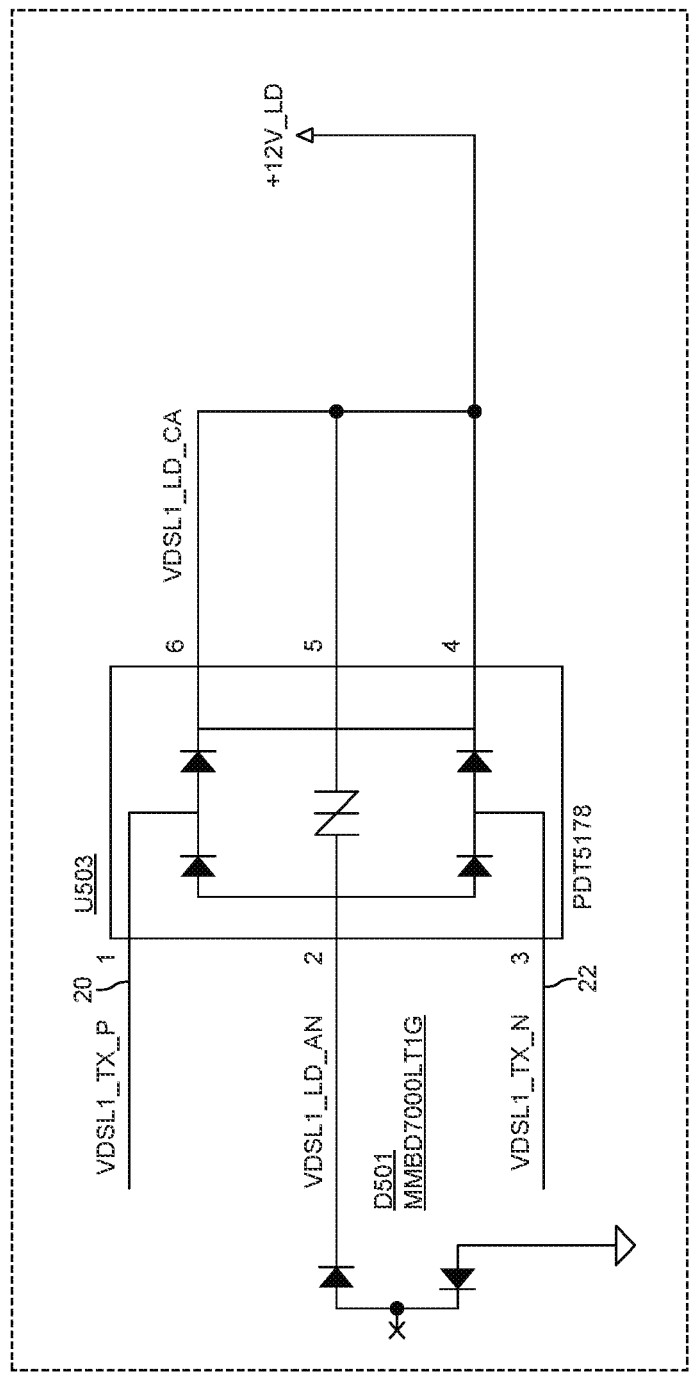

FIGS. 2A and 2B show the ESD clamp schematic. The exemplary new circuit disclosed herein and shown in FIG. 2C replaces the circuit of FIG. 2B and avoids ESD damage by improving the secondary protector common mode clamp on the DSL transmission path.

Consideration was given to using a 3.3V to 12V boost regulator as opposed to a direct power connection to avoid ESD damage due to the possibility that a direct connection to the power supply is capable of larger damaging currents delivered to the line driver when the ESD rail clamps are activated in the fault condition. Such a boost regulator is not as "stiff" as the direct power connection, and as a result may not "fold-over" during the line driver ESD fault condition eliminating damaging currents in the line driver ESD rail clamp.

In FIG. 1, the ESD conduction paths labeled 11 represent current flow from the +12V power supply to an ESD negative going signal on the output pin. This negative ESD conduction path represents the majority of ESD test failures in the negative pulse direction. With most of the failures in a negative ESD pulse test, negative common mode mitigation is desirable for improved ESD immunity of the line driver.

BGW210 HW2.5 Line Driver Power Supply Current Limiting

With the evidence indicating that the +12V power supply stiffness was related to ESD immunity and rail clamp damage, both TBU (Bourns Transient Blocking Unit) and TCS (Bourns Transient Current Suppressor) current limiting devices were tested for ESD immunity improvement. Different current limit levels (250 ma/500 mA) and topologies (combined line drivers and individually) were tried to mitigate ESD rail clamp damage (by limiting +12V current) during the ESD event. These tests were inconclusive, and did not provide adequate margin to be considered a viable ESD mitigation solution.

The conclusion was that there is sufficient energy in the 132 uF +12V MLCC decoupling caps to damage the ESD rail clamp transistors. Simply softening the power supply was insufficient to guarantee 8 kV ESD contact discharge performance of the BGW210 HW2.5 design.

BCM6303 Output Pin TVS Clamping

Adding 12V bi-directional common and differential mode TVS diodes (three bi-directional TVS diodes, two from TIP/RING to ground and one differentially between TIP and RING) at the line driver output pins did not meet the 8 kV ESD contact discharge requirement. This provided additional evidence that DSL transformer secondary protection improvement was required.

BCM6303 Line Driver Output Current Interrupter

Knowing the ESD discharge path was through the line driver output pin(s), use of TBU/TCS current limiting/interrupting devices was tried to eliminate damaging current within the line driver device. These tests were inconclusive by not providing adequate margin to be considered a viable ESD mitigation solution.

SCR Secondary Protection Clamping Device

A silicon controlled rectifier type device, (e.g., Littelfuse DSLP024) was tested in place of the Protek TVS device with added 1M Ohm resistor and +12V clamping diode on the +bias pin. One tested unit passed 8 kV, and failed at 9 kV. This approach has no negative common mode clamp improvement, so was not fully explored.

Improved Secondary Protection Common Mode Clamps

Understanding reduced ESD signal swing at the line driver output pins was a mitigation goal, improved secondary common mode clamping diodes were incorporated. Use of the Littelfuse SP4022 (12V) unidirectional part was selected because of the fast P/N steering diode to be used in parallel with the Protek internal steering diodes.

Figure 2C:
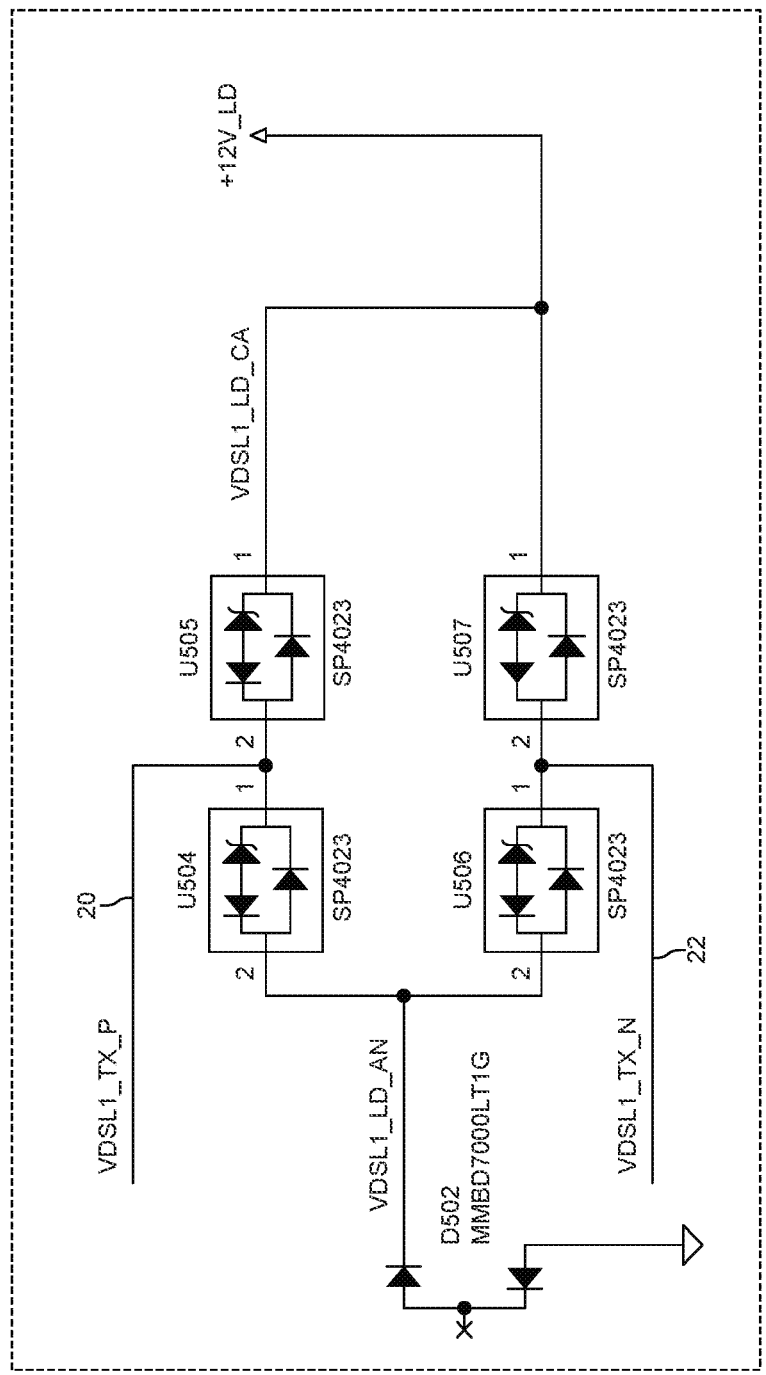
Figure 3:
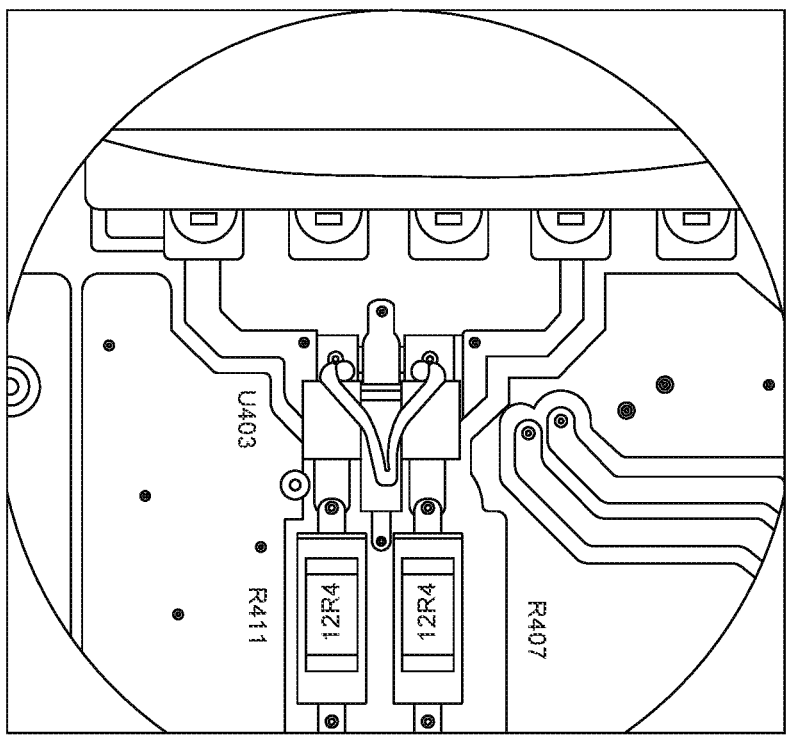
FIG. 3 shows the tested DSL secondary protection circuit.
Figure 4:
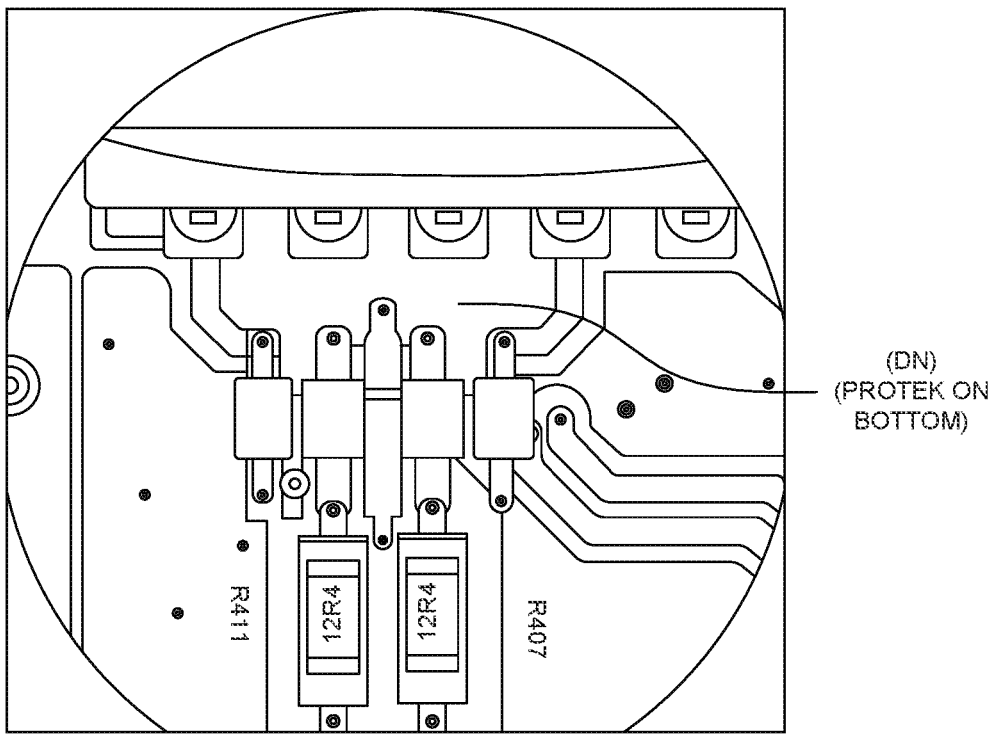
FIG. 4 shows the proposed PCB change.

FIGS. 2-4, ESD negative Common Mode (−CM)/Littelfuse only clamp circuit passing 9 kV, is from test results of FIG. 5 used to determine the circuit design disclosed herein.

Figure 5A:
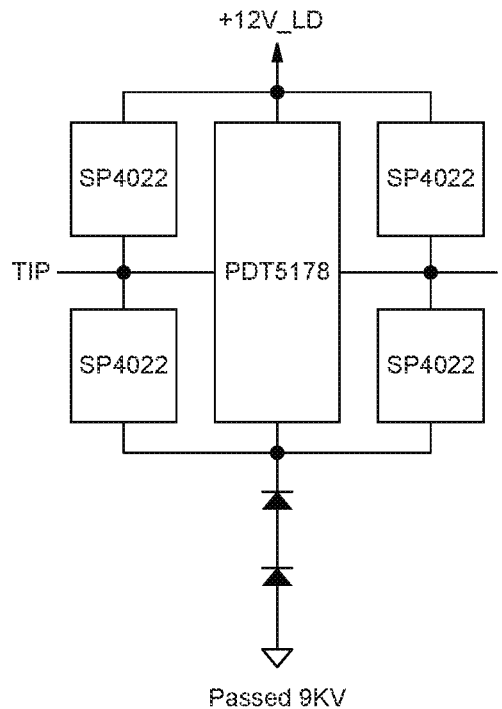
FIGS. 5A-5F show examples of tested circuits.

FIG. 5A shows the Littelfuse SP4022 device in parallel with the Protek PDT5178 steering diodes. This configuration passed up to 9 kV ESD contact discharge level, exceeding the 8 kV requirement.

Figure 5B:
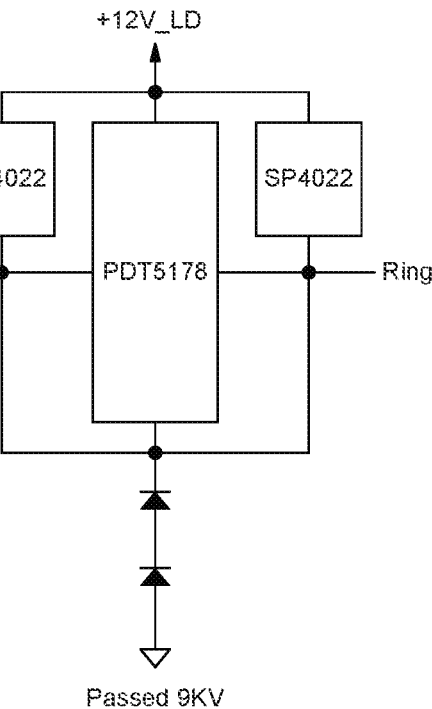

The circuit in FIG. 5B eliminated the lower +CM ground clamp diodes of the SP4022 device. This configuration also passed up to +/−9 kV ESD contact discharge level. This is where the ESD mitigation −CM (line 51 in FIG. 5F, lines 61 in FIG. 6J) improvement discovery was made, confirmed by the FIG. 5 following two tests leading to the proposed design improvement disclosed herein. The upper unidirectional TVS diode in the SP4022 provides the −CM improved margin.

Figure 5C:
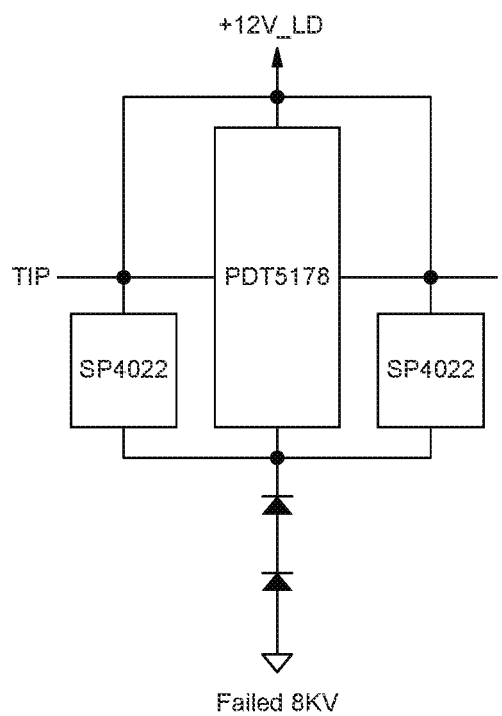
Figure 6A:
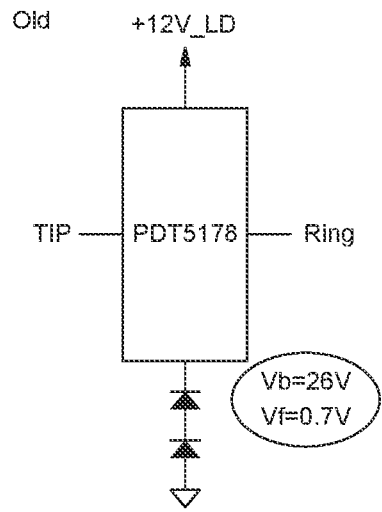
FIG. 6A-6J show comparative circuit examples for ESD secondary protector clamping path.
Figure 6C:
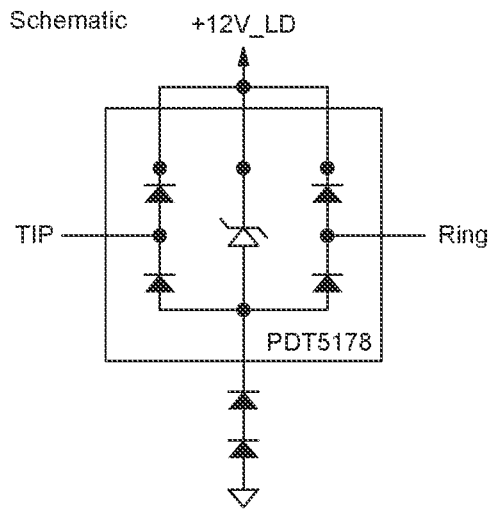
Figure 6B:
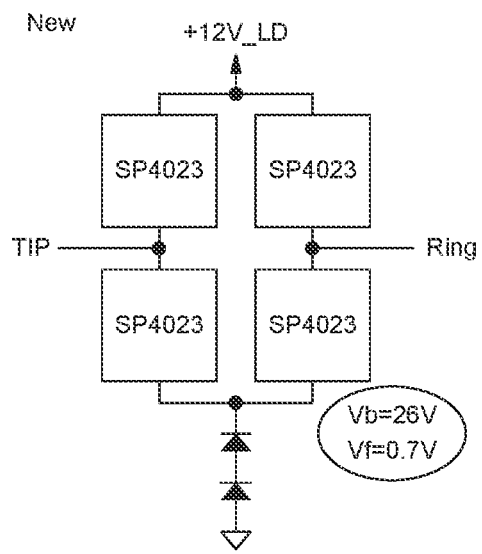
Figure 6D:
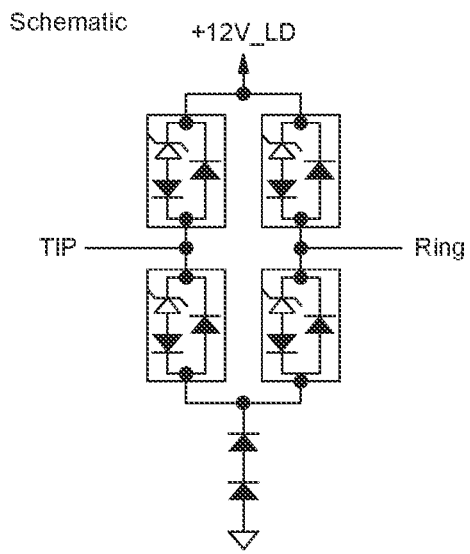
Figure 6E:
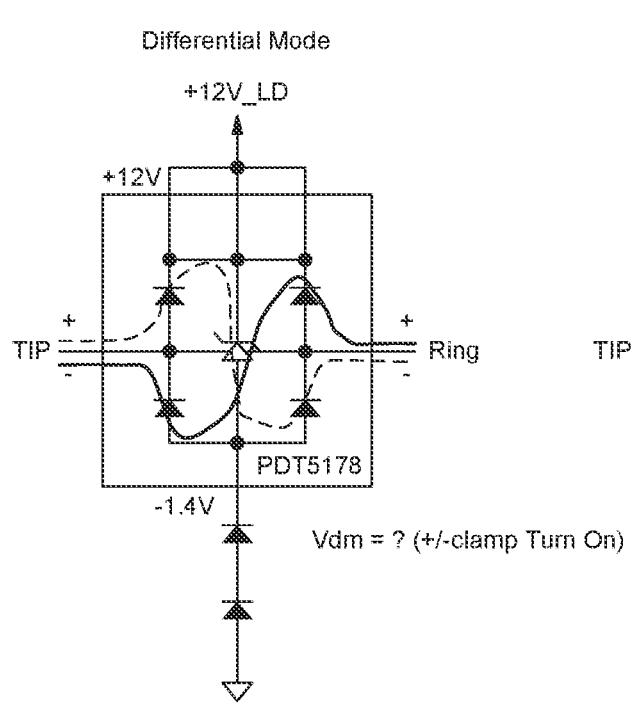
Figure 6G:
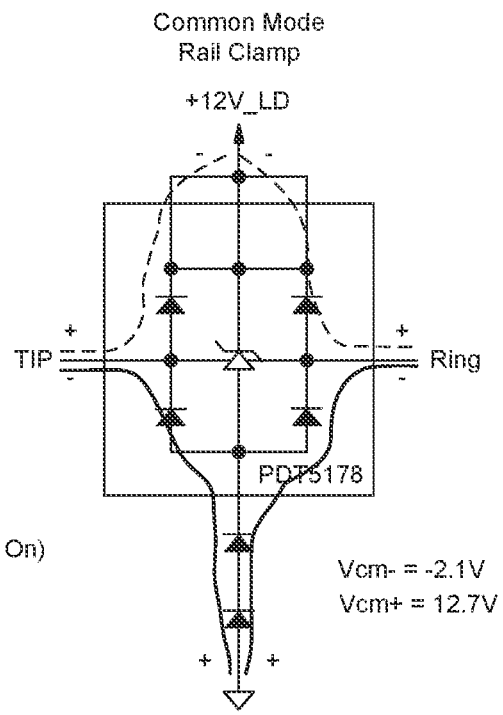
Figure 6F:
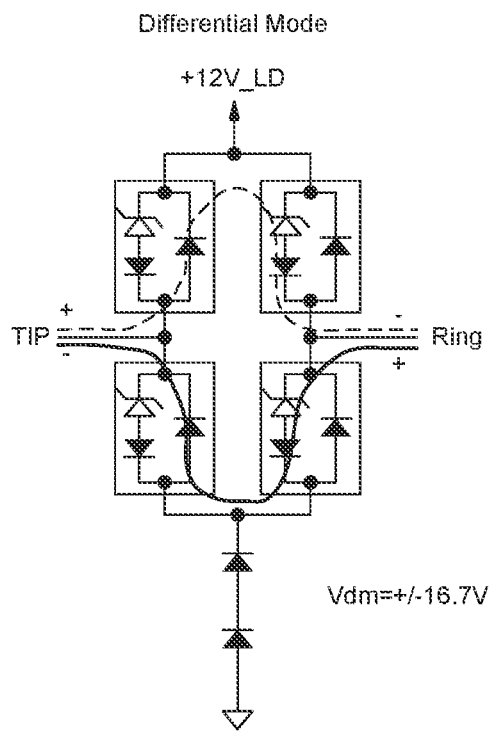
Figure 6H:
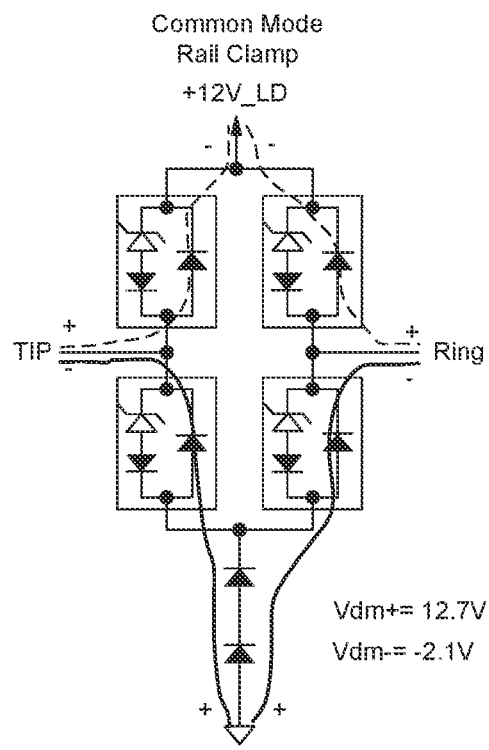
Figure 6I:
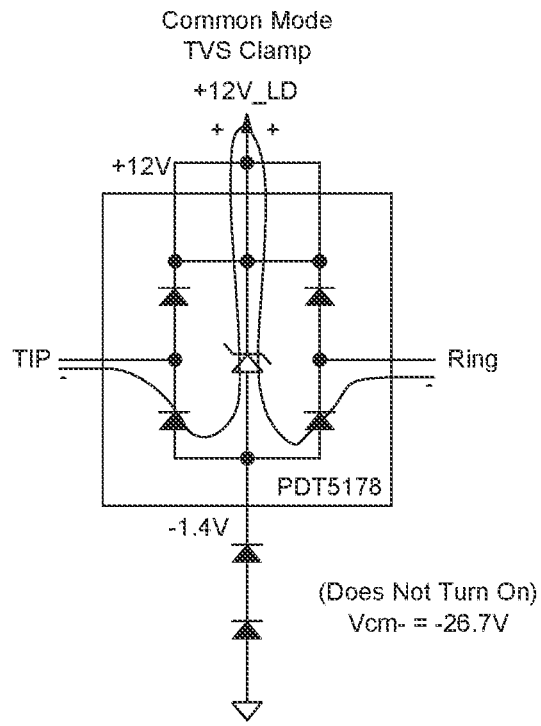
Figure 6J:
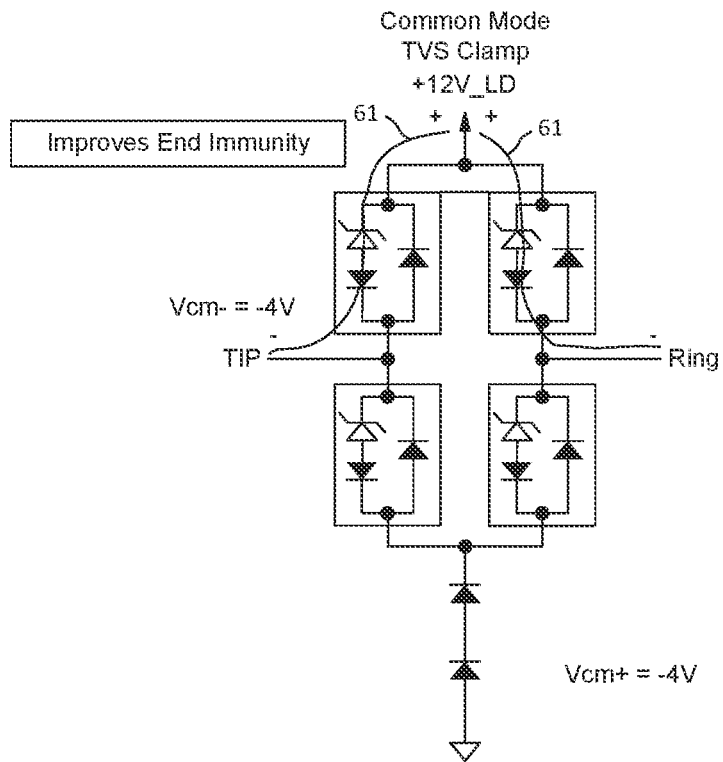
Figure 7A:
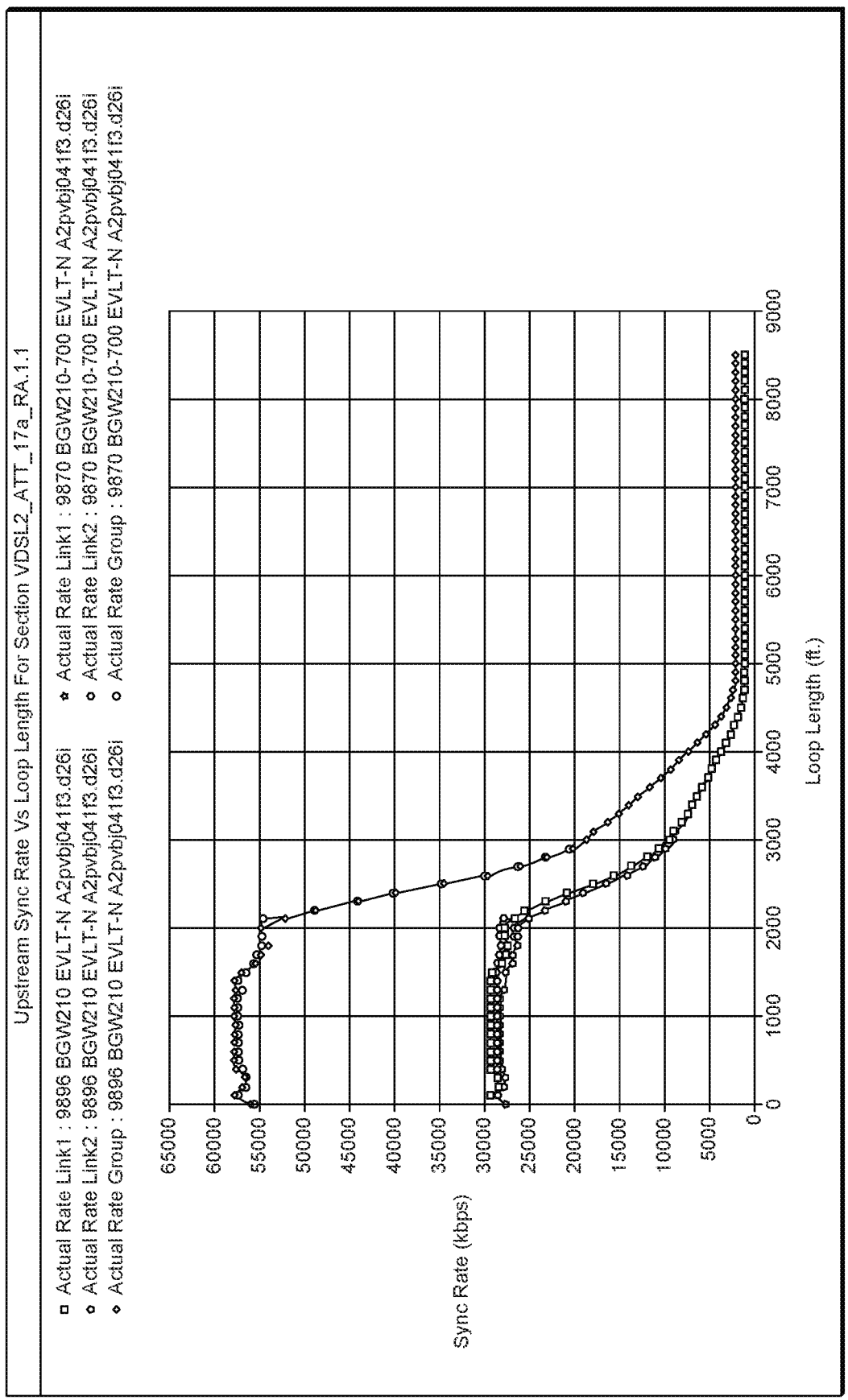
FIG. 7A through 7D show BGW210 ESD improved design rate vs reach baseline comparison.
Figure 7B:
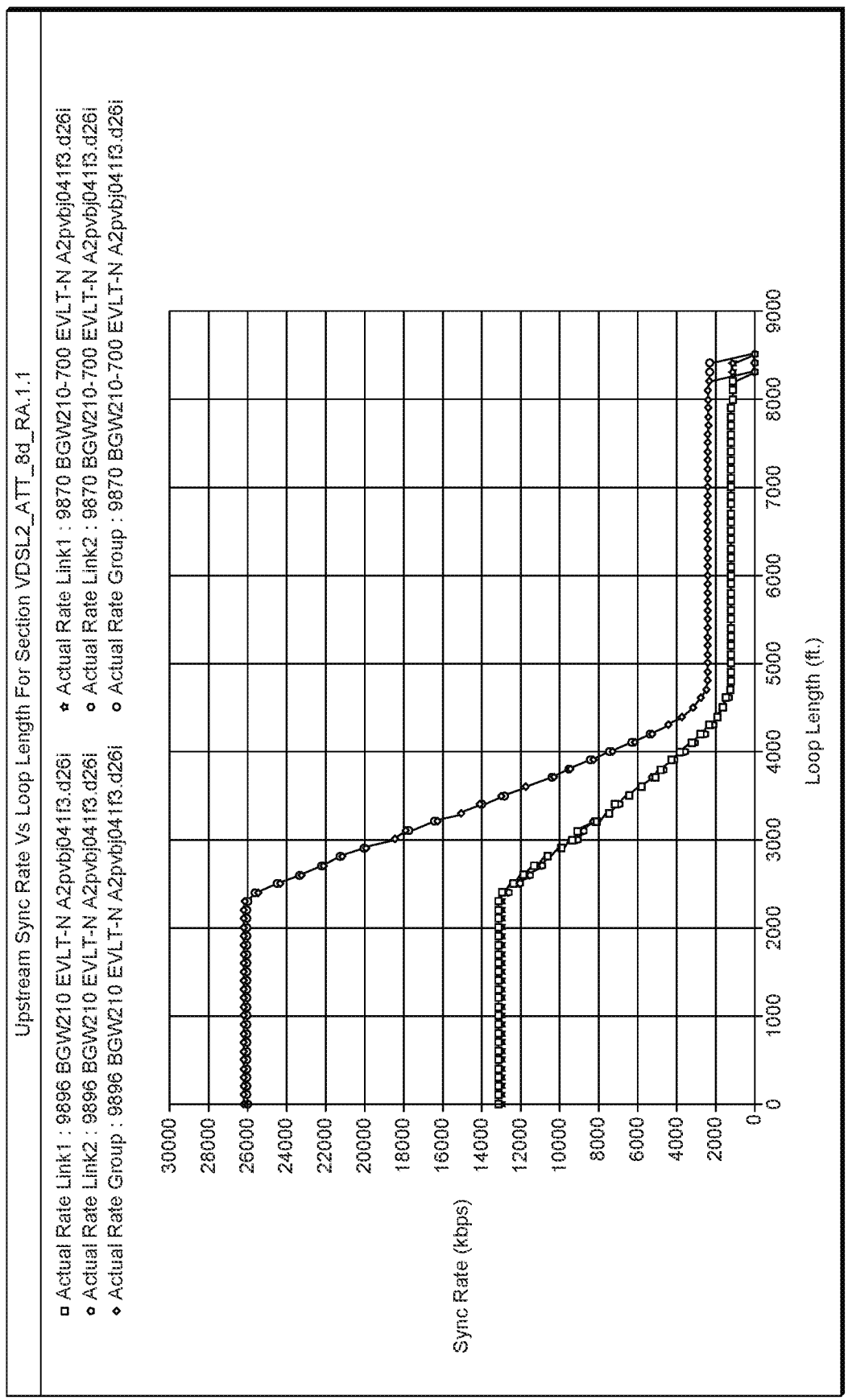
Figure 7C:
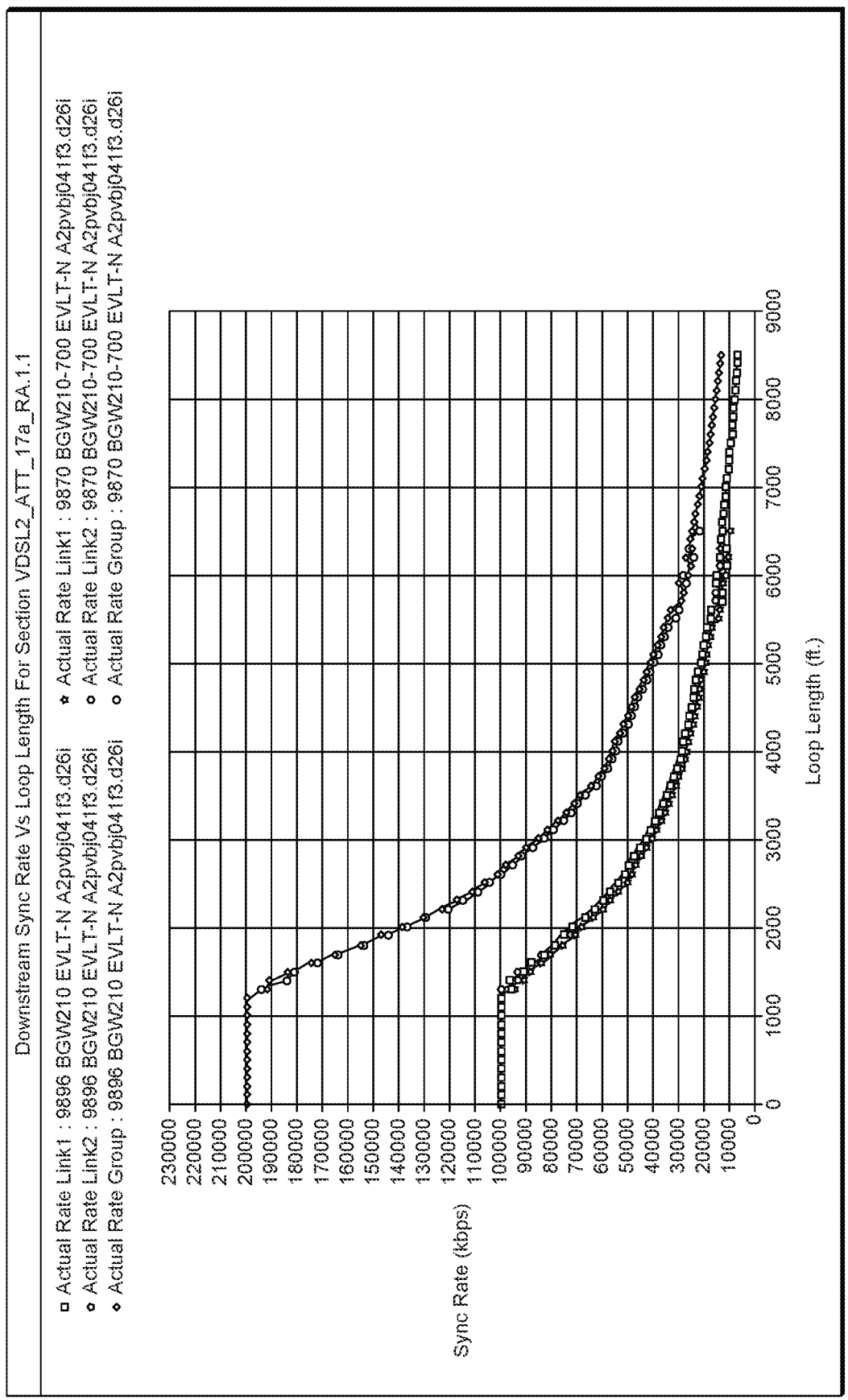
Figure 7D:
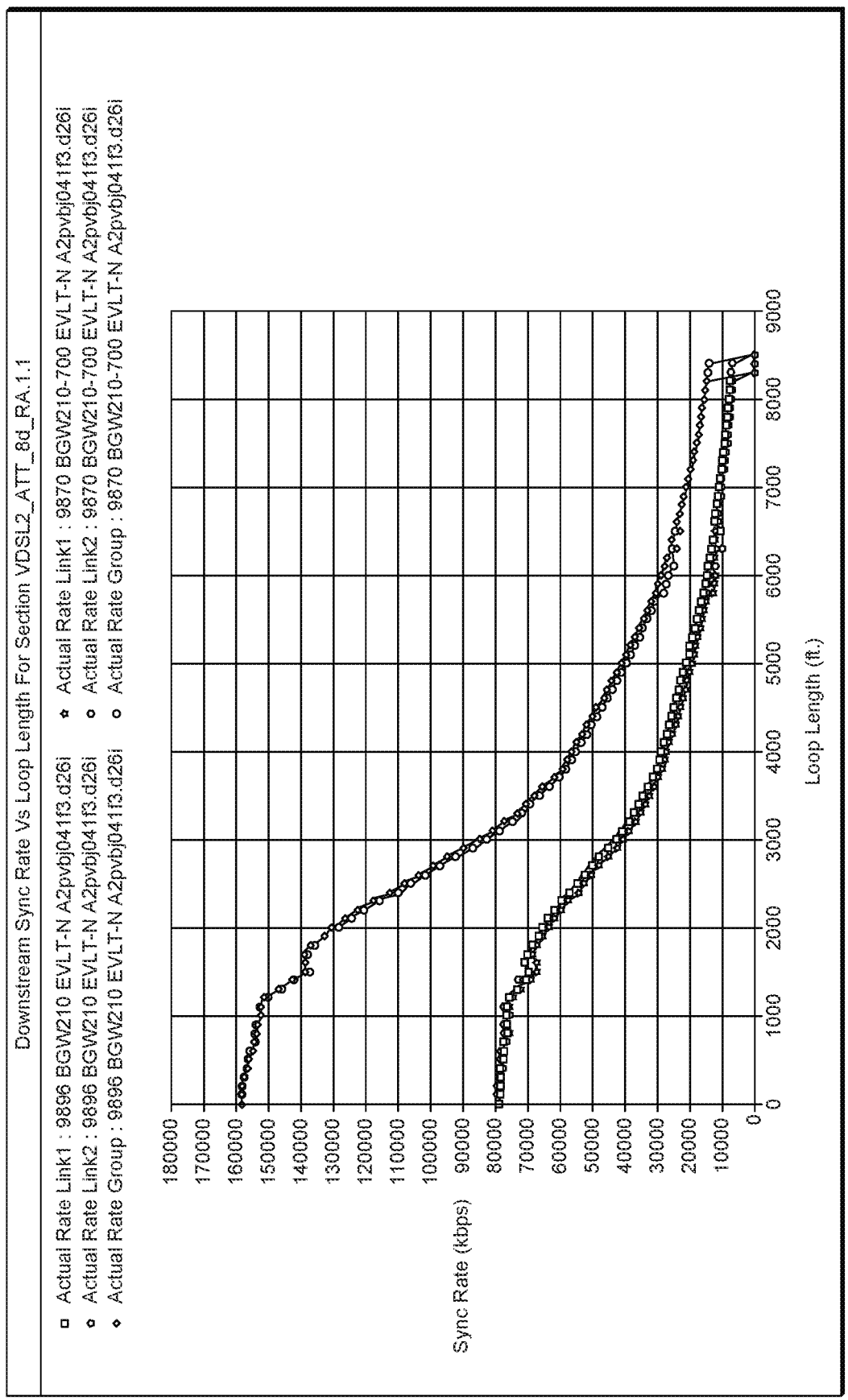

The configuration in FIG. 5C shows only the lower parallel +CM SP4022 parts under test. No −CM ESD contact discharge improvement was noted. This confirmed the observation for the upper TVS diodes improvement just noted above.

Figure 5D:
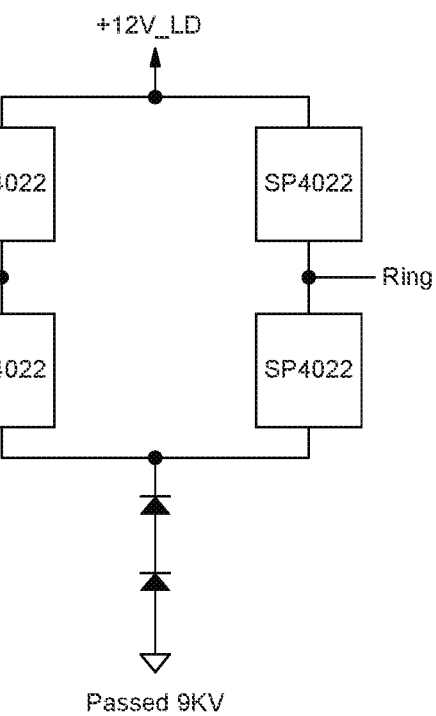
Figure 5E:
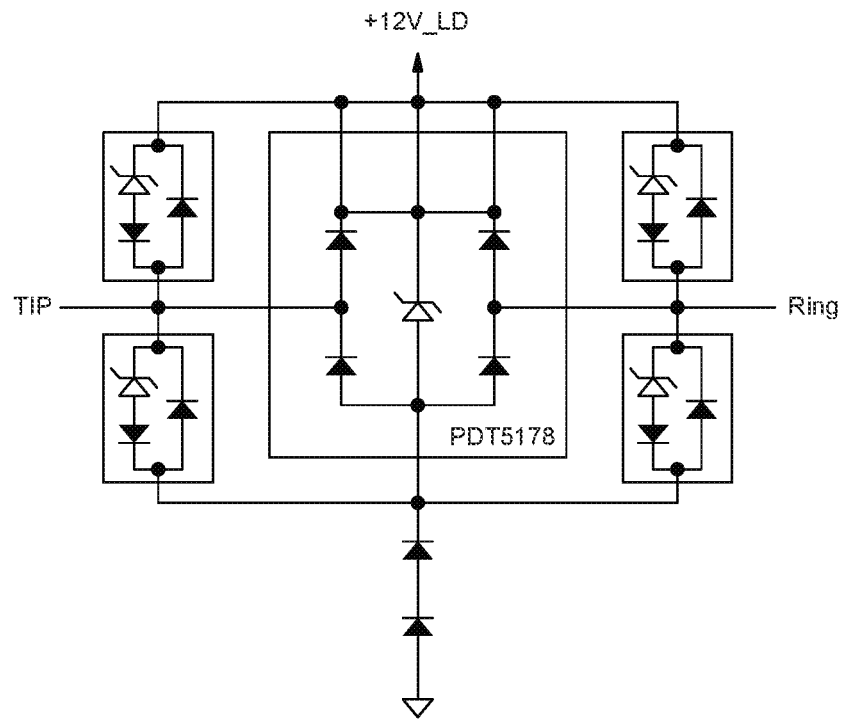
Figure 5F:
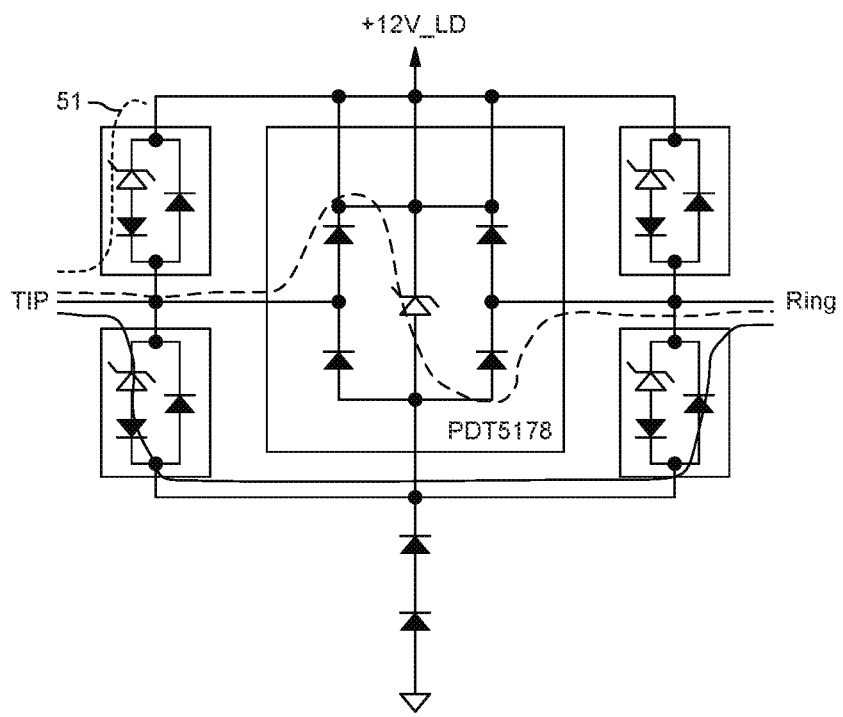

And finally, in the fourth configuration, shown in FIG. 5D, removing redundant Protek PDT5178 protection part and testing only the Littelfuse SP4022 TVS parts was investigated. This confirmed the 9 kV ESD contact discharge level improved design. Accordingly, the proposed ESD configuration has been reached.

As shown in FIGS. 6A-6J, BGW210 HW2.5 ESD Secondary Protector Clamping Path Comparison, it is noted that the −CM clamping voltage of the Protek devices is approximately −26V while the design disclosed herein provides a −CM clamping voltage of approximately −4V. Therefore, the new design disclosed herein does not allow such a large voltage swing. The conclusion was the Littelfuse SP4022 TVS diodes work better than the Protek TVS/steering diodes, but more importantly the SP4022 provided an improved −CM negative signal clamp for the +12V power rail. The latter appears to be a basic design change that provides increased −CM ESD immunity. The SP4022 improved ESD common mode clamp conduction path is shown by the green traces 61 in FIG. 6J. This is proposed as the key change improving ESD immunity for the BGW210 HW2.5 design.

This discovery led to the proposed solution for the BGW210 HW2.5 ESD immunity deficiency. As part of the decision, further consideration of the impact on DSL swing led to the adoption and test of the Littelfuse SP4023, a 15V part, which provides slightly more headroom for the DSL signal. The nominal differential and common mode clamping levels were tested as shown in FIGS. 3 and 4 and take into consideration the final proposal using the Littelfuse SP4023 unidirectional TVS device.

Please note, careful review of FIGS. 2A-2C, BGW210 HW2.5 ESD Secondary Protector Clamping Path Comparison, shows design compliance with the signaling levels at the DSL transformer secondary protection circuit. The DSL signal swing at the secondary protection circuit and transformer is differentially 11Vpp, or −0.25V to 5.25V single ended. For reference, the signaling at the line driver outputs are differentially ~22Vpp, or −2.95V to +7.95V single ended.

Proposed ESD Circuit Improvement

FIG. 2B shows the old (Protek PDT5178) secondary protection circuit and FIG. 2C shows the new (Littelfuse SP4023) secondary protection circuit. This proposal is to replace the Protek device with four Littelfuse TVS, or similar, parts on the top side of the circuit board improving −CM ESD surge protection. The plan is to provide a Protek back-up stuff option on the bottom side of the board, providing PCB space allows such a configuration. The circuit of FIG. 2C connects to the tip line 20 and ring line 22 going to the protected electronic DSL component 200 (a part of which is shown in the upper left corner of FIG. 2A).

Testing has shown the proposed Littelfuse design change improves ESD immunity, while maintaining both Surge and DSL performance levels. For DSL RvR results, please refer to FIGS. 7A-7D, BGW210 ESD Improved Design Rate vs Reach Baseline Comparison.

To summarize FIG. 6A-6J, inference from measured results show this change provides improved negative common mode voltage clamping at the line driver output pin. By clamping with respect to the +12V power rail and minimizing the negative swing, the internal ESD rail clamp is under less stress. The updated design also provides earlier activation of the differential clamping between the TIP and RING lines.

FIG. 3 shows the tested DSL secondary protection circuit. The Protek device was removed, and the Littelfuse parts installed (stacked) across the pads for the high-side common mode clamp, and piggybacked on top for the low-side. FIG. 4 shows a mock-up of the proposed PCB change. The plan is for the Protek device to be a "noinstall" option on the bottom side of the board.

DSL Secondary Protector Modified Design—ESD/Surge/DSL RvR Test Results

Ten BGW210 HW2.5 boards were tested with the proposed Littelfuse SP4023 (15V) replacement of the Protect PDT5178 part. All ten modified boards passed both the 8 kV ESD contact discharge requirement and the 200-boot cycle test. No trouble was found on any of the modified boards. In addition, two boards (SN R9ING8HL100054, R9ING8HL100246) passed the DSL Surge test requirement, and two other ESD stressed boards (SN R9ING8HL100XXX, R9ING8HL100267) passed baseline DSL Rate versus Reach (RvR) tests (please see FIGS. 7A-7D).

Some of the boards were tested to failure after passing 9 kV initially followed by the 200 reboot test. The boards were tested to failure where a DSL line driver case temperature rise was noted. From the available results, all units passed at a level of 8 kV (or higher)+200 reboot cycles. Of the eight units tested to failure (TEMP rise), one 9 kV, one 10 kV, and six 14 kV ESD failures were observed. All ESD stressed units passed the 8 kV contact discharge requirement.

ESD/Surge Protection Device Electrical Specifications

The Protek PDT5178 is the TVS w/steering diodes (two signal) part currently in production use on the BGW210. The Littelfuse SP4023 and the alternate Protek GBLC15 are the TVS w/steering diodes (single signal) parts proposed for use on BGW210 in this document. Though the parts are not an exact match, and offer slightly different parametric specifications, they are comparable in ESD and Surge performance levels. Furthermore, the worst case capacitive loading is currently the best for the Littelfuse solution, resulting in similar DSL performance compared with the Protek part.

FIGS. 7A through 7D show BGW210 ESD improved design rate vs reach baseline comparison.

FIG. 8 shows ESD results.

FIG. 9 shows absolute maximum power ratings.

FIG. 10 shows electrical characteristics at 25 degrees Celsius.

CONCLUSIONS

Though direct measurement of ESD induced signals are impractical, inference from targeted statistical test results provided a BGW210 HW2.5 ESD contact discharge immunity improvement solution. Along with improved ESD performance, the proposed design change has similar performance of DSL Surge and RvR results. The proposed change is an improvement to the existing production BGW210 HW2.5 design using similar ESD and surge protection TVS/Steering diode methodologies for signal/power clamp protection with improved (lower) ESD −CM clamp.

The proposed change is confined to a small area of the overall BGW210 board, not requiring retesting of other sub-systems and circuits in the design. The proposed change has limited impact on the PCB floorplan. The changes are planned to maintain the existing Protek protection device as a back-up stuff option on the bottom side of the board.

The proposed change improves both differential and common mode protection against ESD and Surge damaging events. There is little risk in making this change, and measured statistical gains have been noted for the design change of replacing the DSL secondary protector device (Protek PDT5178) with four unidirectional TVS devices (Littelfuse SP4023 or equivalent).

The proposed DSL secondary protector change allows the BGW210 HW2.5 to satisfy the required 8 kV ESD contact discharge specification without compromise of the overall product release.

The invention claimed is:

1. A protection circuit for use with an electronic component having a tip connection and a ring connection, the protection circuit comprising:
 a first unidirectional transient-voltage-suppression (TVS) diode array (UTVSDA), having a negative breakdown voltage BDV and a diode forward voltage DV connected between a supply voltage (Vcc) and the tip connection of the electronic component, wherein the first UTVSDA comprises a first TVS diode in series with a first diode which are connected in parallel to another first diode;

a second UTVSDA, having a negative breakdown voltage BDV and a diode forward voltage DV connected between the tip connection of the electronic component and a negative ground clamp node, wherein the second UTVSDA comprises a second TVS diode in series with a second diode which are connected in parallel to another second diode;

a third UTVSDA, having a negative breakdown voltage BDV and a diode forward voltage DV connected between Vcc and the ring connection of the electronic component, wherein the third UTVSDA comprises a third TVS diode in series with a third diode which are connected in parallel to another third diode; and a fourth UTVSDA, having a negative breakdown voltage BDV and a diode forward voltage DV connected between the ring connection of the electronic component and the negative ground clamp node, wherein the fourth UTVSDA comprises a fourth TVS diode in series with a fourth diode which are connected in parallel to another fourth diode;

wherein the tip connection to the Vcc via the first UTVSDA and the ring connection to the Vcc via the third UTVSDA forms an electrostatic common mode clamp conduction path so as to provide a negative common mode (CM) negative signal clamp for Vcc.

2. The protection circuit according to claim 1, wherein a TVS clamp amount for a negative common mode voltage on the tip and ring connections is substantially Vcc minus BDV and positive common mode voltage on the tip and ring connections is substantially Vcc plus DV.

3. The protection circuit according to claim 1, wherein a diode clamp amount for a secondary negative common mode voltage clamp on the tip and ring connections is substantially voltage at negative ground clamp minus DV.

4. The protection circuit according to claim 1, wherein a clamp amount of a differential mode voltage between the tip and ring connections is substantially BDV.

5. The protection circuit according to claim 1, wherein Vcc is provided by a +12 volt power rail.

6. The protection circuit according to claim 1, wherein the first TVS diode anode is connected to the first diode anode, the second TVS diode anode is connected to the second diode anode, the third TVS diode anode is connected to the third diode anode, and the fourth TVS diode anode is connected to the fourth diode anode.

7. The protection circuit according to claim 6, wherein the first TVS diode cathode is connected to the another first diode cathode, wherein the second TVS diode cathode is connected to the another second diode cathode, wherein the third TVS diode cathode is connected to the another third diode cathode, and wherein the fourth TVS diode cathode is connected to the another fourth diode cathode.

8. The protection circuit according to claim 7, wherein the first diode cathode is connected to the another first diode anode, wherein the second diode cathode is connected to the another second diode anode, wherein the third diode cathode is connected to the another third diode anode, wherein the fourth diode cathode is connected to the another fourth diode anode.

9. The protection circuit according to claim 1, wherein the protection circuit is a printed circuit board (PCB).

10. The protection circuit according to claim 1, wherein the electronic component is an electronic digital subscriber line (DSL) component.

11. A plurality of unidirectional transient-voltage suppression (TVS) diode arrays (UTVDAs) for use with an electronic component, the plurality of UTVSDAs comprising:

a first UTVSDA, having a negative breakdown voltage BDV and a diode forward voltage DV connected between a supply voltage (Vcc) and a tip connection of the electronic component, wherein the first UTVSDA comprises a first TVS diode in series with a first diode which are connected in parallel to another first diode;

a second UTVSDA, having a negative breakdown voltage BDV and a diode forward voltage DV connected between the tip connection of the electronic component and a negative ground clamp node, wherein the second UTVSDA comprises a second TVS diode in series with a second diode which are connected in parallel to another second diode;

a third UTVSDA, having a negative breakdown voltage BDV and a diode forward voltage DV connected between Vcc and a ring connection of the electronic component, wherein the third UTVSDA comprises a third TVS diode in series with a third diode which are connected in parallel to another third diode; and a fourth UTVSDA, having a negative breakdown voltage BDV and a diode forward voltage DV connected between the ring connection of the electronic component and the negative ground clamp node, wherein the fourth UTVSDA comprises a fourth TVS diode in series with a fourth diode which are connected in parallel to another fourth diode;

wherein the tip connection to the Vcc via the first UTVSDA and the ring connection to the Vcc via the third UTVSDA forms an electrostatic common mode clamp conduction path so as to provide a negative common mode (CM) negative signal clamp for Vcc.

12. The plurality of UTVSDAs according to claim 11, wherein a TVS clamp amount for a negative common mode voltage on the tip and ring connections is substantially Vcc minus BDV and positive common mode voltage on the tip and ring connections is substantially Vcc plus DV.

13. The plurality of UTVSDAs according to claim 11, wherein a diode clamp amount for a secondary negative common mode voltage clamp on the tip and ring connections is substantially voltage at negative ground clamp minus DV.

14. The plurality of UTVSDAs according to claim 11, wherein a clamp amount of a differential mode voltage between the tip and ring connections is substantially BDV.

15. The plurality of UTVSDAs according to claim 11, wherein Vcc is provided by a +12 volt power rail.

16. The plurality of UTVSDAs according to claim 11, wherein the first TVS diode anode is connected to the first diode anode, the second TVS diode anode is connected to the second diode anode, the third TVS diode anode is connected to the third diode anode, and the fourth TVS diode anode is connected to the fourth diode anode.

17. The plurality of UTVSDAs according to claim 16, wherein the first TVS diode cathode is connected to the another first diode cathode, wherein the second TVS diode cathode is connected to the another second diode cathode, wherein the third TVS diode cathode is connected to the another third diode cathode, and wherein the fourth TVS diode cathode is connected to the another fourth diode cathode.

18. The plurality of UTVSDAs according to claim 17, wherein the first diode cathode is connected to the another first diode anode, wherein the second diode cathode is connected to the another second diode anode, wherein the third diode cathode is connected to the another third diode anode, wherein the fourth diode cathode is connected to the another fourth diode anode.

19. The plurality of UTVSDAs according to claim 11, wherein the protection circuit is a printed circuit board (PCB).

20. The plurality of UTVSDAs according to claim 11, wherein the electronic component is an electronic digital subscriber line (DSL) component.

\* \* \* \* \*